US008615195B2

(12) United States Patent
Moosavi (10) Patent No.: US 8,615,195 B2
(45) Date of Patent: *Dec. 24, 2013

(54) MOBILE WIRELESS COMMUNICATIONS DEVICE HAVING TOUCH ACTIVATED NEAR FIELD COMMUNICATIONS (NFC) CIRCUIT

(71) Applicant: Research In Motion Limited, Waterloo (CA)

(72) Inventor: Vahid Moosavi, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/718,125

(22) Filed: Dec. 18, 2012

(65) Prior Publication Data

US 2013/0109311 A1    May 2, 2013

Related U.S. Application Data

(63) Continuation of application No. 12/241,111, filed on Sep. 30, 2008, now Pat. No. 8,351,854.

(51) Int. Cl.
*H04B 5/00*   (2006.01)
*H04M 11/00*  (2006.01)

(52) U.S. Cl.
USPC ........................ 455/41.1; 379/93.19

(58) Field of Classification Search
USPC ......... 455/41.1, 41.2, 254, 575.3, 466, 550.1, 455/90.1, 90.2, 90.3; 379/93.19
See application file for complete search history.

(56) References Cited

U.S. PATENT DOCUMENTS

| 5,432,510 | A | 7/1995 | Matthews |
| 7,769,345 | B2 | 8/2010 | Johnson et al. |
| 8,351,854 | B2 * | 1/2013 | Moosavi ...................... 455/41.1 |
| 2005/0222961 | A1 | 10/2005 | Staib et al. |
| 2006/0148404 | A1 | 7/2006 | Wakim |
| 2007/0095892 | A1 | 5/2007 | Lyons et al. |
| 2007/0116292 | A1 | 5/2007 | Kurita et al. |
| 2007/0124503 | A1 | 5/2007 | Ramos et al. |
| 2007/0156436 | A1 | 7/2007 | Fisher et al. |
| 2007/0176903 | A1 | 8/2007 | Dahlin et al. |
| 2007/0197261 | A1 | 8/2007 | Humbel |
| 2007/0232232 | A1 | 10/2007 | Matsuo et al. |
| 2007/0239981 | A1 | 10/2007 | Lessing |
| 2007/0266131 | A1 | 11/2007 | Mazur et al. |
| 2009/0036176 | A1 | 2/2009 | Ure |

FOREIGN PATENT DOCUMENTS

| JP | 2006338480 | 12/2006 |
| JP | 2006345016 | 12/2006 |
| JP | 2006352574 | 12/2006 |
| JP | 2008079127 | 4/2008 |

(Continued)

*Primary Examiner* — Eugene Yun
(74) *Attorney, Agent, or Firm* — Allen, Dyer, Doppelt, Milbrath & Gilchrist, P.A. Attorneys at Law (57) ABSTRACT

A mobile wireless communications device includes a housing and a circuit board carried by the housing and including Radio Frequency (RF) circuitry and a processor carried by the housing and operative with each other. A Near Field Communications (NFC) circuit is positioned on the circuit board and operative with the processor for communicating in accordance with the NFC communication protocol. A touch activated sensor is supported by the housing and operative for enabling operation of the NFC circuit when touched to establish NFC communications from the communications device.

18 Claims, 5 Drawing Sheets

(56) References Cited

FOREIGN PATENT DOCUMENTS

| | | |
|---|---|---|
| JP | 2008092304 | 4/2008 |
| WO | 2004089006 | 10/2004 |
| WO | 2006027725 | 3/2006 |
| WO | 2006087503 | 8/2006 |
| WO | 2007057786 | 5/2007 |
| WO | 2007112787 | 11/2007 |
| WO | 2008042903 | 4/2008 |

* cited by examiner

MOBILE WIRELESS COMMUNICATIONS DEVICE HAVING TOUCH ACTIVATED NEAR FIELD COMMUNICATIONS (NFC) CIRCUIT

FIELD

This device and method relates to the field of communications devices, and more particularly, to mobile wireless communications devices and related systems and methods that use Near Field Communications (NFC).

BACKGROUND

Cellular communication systems continue to grow in popularity and have become an integral part of both personal and business communications. Cellular telephones and similar devices allow users to place and receive phone calls most anywhere they travel. Moreover, as cellular telephone technology has increased, so too has the functionality of cellular devices. For example, many cellular devices now incorporate Personal Digital Assistant (PDA) features such as calendars, address books, task lists, calculators, memo and writing programs, etc. These multi-function devices usually allow users to send and receive electronic mail (email) messages wirelessly and access the internet via a cellular network and/or a wireless local area network (WLAN), for example.

Some cellular devices incorporate contactless card technology and/or Near Field Communication chips. Near Field Communication technology is commonly used for contactless short-range communications based on radio frequency identification (RFID) standards, using magnetic field induction to enable communication between electronic devices, including mobile wireless communications devices. These short-range applications include payment and ticketing, electronic keys, identification, device set-up service and similar information sharing. This short-range high frequency wireless communication technology exchanges data between devices over a short distance, such as only a few centimeters.

Near Field Communication (NFC) technology is an extension of the ISO 14443 proximity-card standard as a contactless card, RF ID standard that incorporates the interface of a smart card and a reader into one device. A NFC device such as a mobile phone typically includes an NFC integrated circuit (IC) chip that communicates with both existing ISO 14443 smart cards and readers and other NFC devices and compatible with any existing contactless infrastructure. The NFC IC chips use magnetic field induction where two loop antennas are located near each other and form an air-core transformer. The technology operates on the unlicensed radio frequency ISM band of about 13.56 MHz and has a bandwidth of about 2 MHz. The working distance is usually about 0 to 20 centimeters and a user of the NFC device touches another NFC device or tag to initiate communication, with data rates ranging from 106 to about 424 kbit/s. Most mobile wireless communications devices operate in an active communications mode using a modified Miller and 100% amplitude shift keyed (ASK) code unless a passive mode is used in which a Manchester and ASK code is used. Further details are set forth in the Mobile NFC Technical Guidelines, Version 2.0, November 2007 by GSMA, the disclosure which is hereby incorporated by reference in its entirety.

BRIEF DESCRIPTION OF THE DRAWINGS

Other objects, features and advantages will become apparent from the detailed description which follows when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

The NFC and RFID communications protocols are based on responding to an external request by sending the universal ID (UID) number. Thus, an NFC-enabled phone (or NFC-enabled credit card) sends its UID to another device without the owner's consent, raising security and privacy concerns. For example, an NFC-enabled credit card, such as the MasterCard PayPass™ card, can authenticate a less than $50.00 transaction without the owner's consent by bringing a reader/writer close to the card, for example, even when the card is in an owner's pocket. Also, an NFC-enabled phone is typically used as a reader/writer and uses relatively high power to provide an electromagnetic field for searching and powering up tags. Thus, the NFC radio on a NFC-enabled wireless communications device or other handheld has to be turned on only when required. There are some discussions in the industry for a technical solution allowing the NFC to be on only when a NFC application is running. This is a better solution than having the device "always-on", but this technical solution is inadequate because it compromises the ease-of-use and simplicity that the NFC device is supposed to address. In that technical solution a user must go to the home screen of the mobile wireless communications device and stop the application that the user is currently using and find the correct NFC application, start that correct NFC application and hold the device in front of a reader/tag or other NFC device. This technical solution is cumbersome for a technology that is based on simplicity and ease-of-use.

A mobile wireless communications device includes a housing and a circuit board carried by the housing and including Radio Frequency (RF) circuitry and a processor carried by the housing and operative with each other. A Near Field Communications (NFC) circuit is positioned on the circuit board and operative with the processor for communicating in accordance with the NFC communication protocol. A first touch activated sensor is supported by the housing and operative for enabling operation of the NFC circuit when touched to establish NFC communications from the communications device.

The mobile wireless communications device has a touch activated sensor positioned to be touched by at least one finger when the housing is manually grasped and placed near another NFC enabled tag or device. First and second touch activated sensors can be supported by the housing and positioned to be touched to enable the NFC circuit and establish NFC communications. The housing includes opposing sides and a touch activated sensor is positioned at each side of the housing such that both must be touched to establish NFC communications.

A touch activated sensor can be formed as a capacitive touch sensor and be formed as a capacitive-to-digital converter and processor associated therewith. The NFC circuit is formed as a NFC integrated circuit (IC) chip mounted on a circuit board. A power circuit supplies power to the NFC circuit and a switch is connected between the power circuit and connected to the at least one touch activated sensor and operable for switching power ON to the NFC circuit only when the touch activated sensor is touched. Another touch activated sensor can ensure that there are no false positives when the NFC circuit is enabled. A method aspect is also set forth.

In accordance with non-limiting examples, a mobile wireless communications device includes a housing and circuit board carried by the housing. One or more circuit boards carry in one aspect a radio frequency (RF) circuit and processor operative with each other, and a Near Field Communications (NFC) integrated circuit operable with the processor for allowing the mobile wireless communications device to operate with other NFC enabled devices and conduct various transactions such as mobile ticketing, mobile payment, smart poster, Bluetooth Pairing, electronic tickets, and numerous other mobile commerce applications. The NFC circuit in one non-limiting example is a separate NFC IC chip positioned such as on a circuit board containing other processors and components.

In this description, the terms touch sensors and touch activated sensors can refer to the same sensor. The mobile wireless communications device includes a first touch sensor and preferably first and second touch sensors positioned at the side of the device to activate the NFC circuit on the mobile wireless communications device when the user intends to use the NFC circuitry in the device. Typically, a touch sensor is positioned at each side of the mobile wireless communications device, permitting the user to grasp the device by two fingers and activate the NFC circuit. Typically the touch sensors are located in the middle section at the sides and near the same level as the center of gravity for the device to make it easier for a user to hold the device with two fingers. Otherwise, it would be difficult for the user to balance the device in a quick manner and for efficient operation when trying to activate and use the NFC circuitry. The touch sensors can be formed as capacitive touch sensors in a a non-limiting example, and when in a finger-detect mode, use very low power (less than about 20 microamperes), and thus, the capacitive touch sensors can be "on" all the time (or perhaps only when backlight is on).

Typically, the capacitive touch sensors will be located below the housing in those places that get touched when the user desires to use the NFC circuit. For example, the capacitive touch sensors could be located on both sides of the housing forming the mobile wireless communications device such that the housing can be marked with the location of the capacitive touch sensors. It is also possible to have a NFC logo on the housing of the device and the capacitive touch sensors placed below the NFC logo on the housing. Although capacitive touch sensors are preferred, it should be understood that it is also possible to use a mechanical switch or some other resistive touch sensor if the sensors are placed where there is little chance that the switch or sensors are unintentionally activated, for example, when the mobile wireless communications device is contained in the pocket of a user.

Any touch sensors used with mobile wireless communications device or similar sensors or switches could also be used for credit cards and NFC tags. The touch sensor that detects the finger touch could be added to the NFC chip in the card and when the user touches the card surface, the NFC circuitry as a radio is activated. A user could touch an area that is marked on the card before the card responds to any NFC reader/writer.

Figure 1:
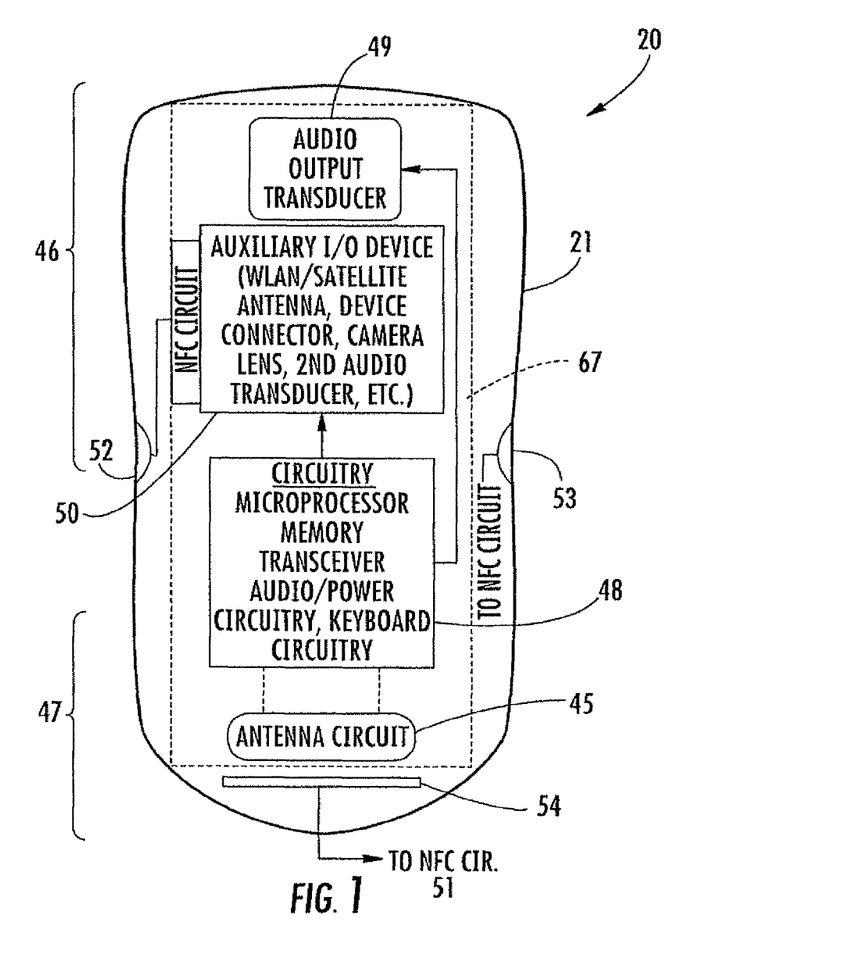
FIG. 1 is a schematic block diagram of an example of a mobile wireless communications device configured as a handheld device that can be used in accordance with non-limiting examples and illustrating basic internal components thereof in accordance with a non-limiting example.
Figure 2:
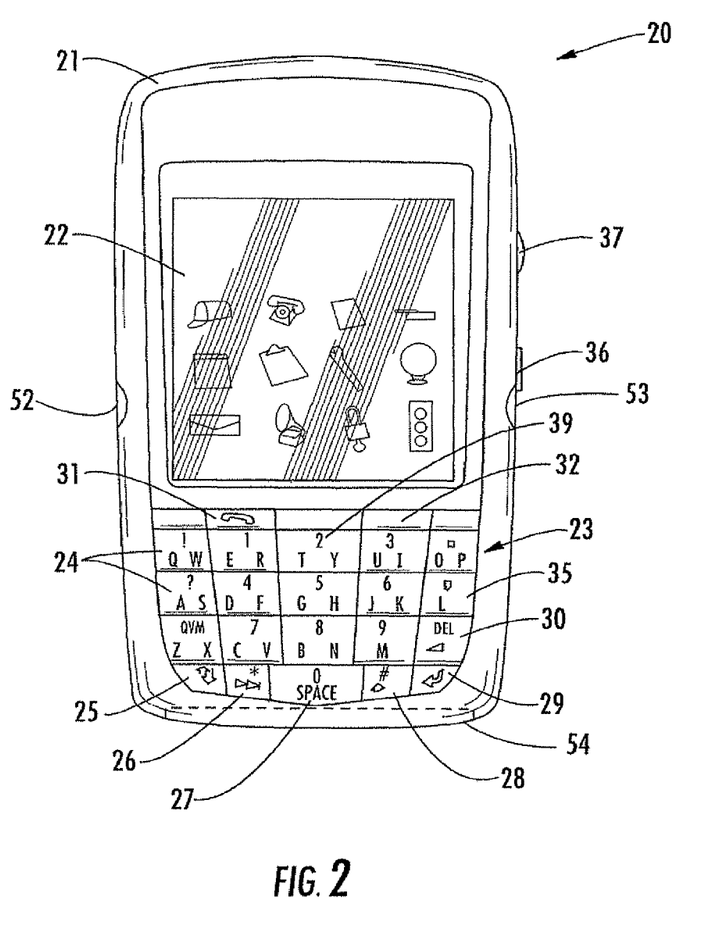
FIG. 2 is a front elevation view of the mobile wireless communications device of FIG. 1 in accordance with a non-limiting example.
Figure 3:
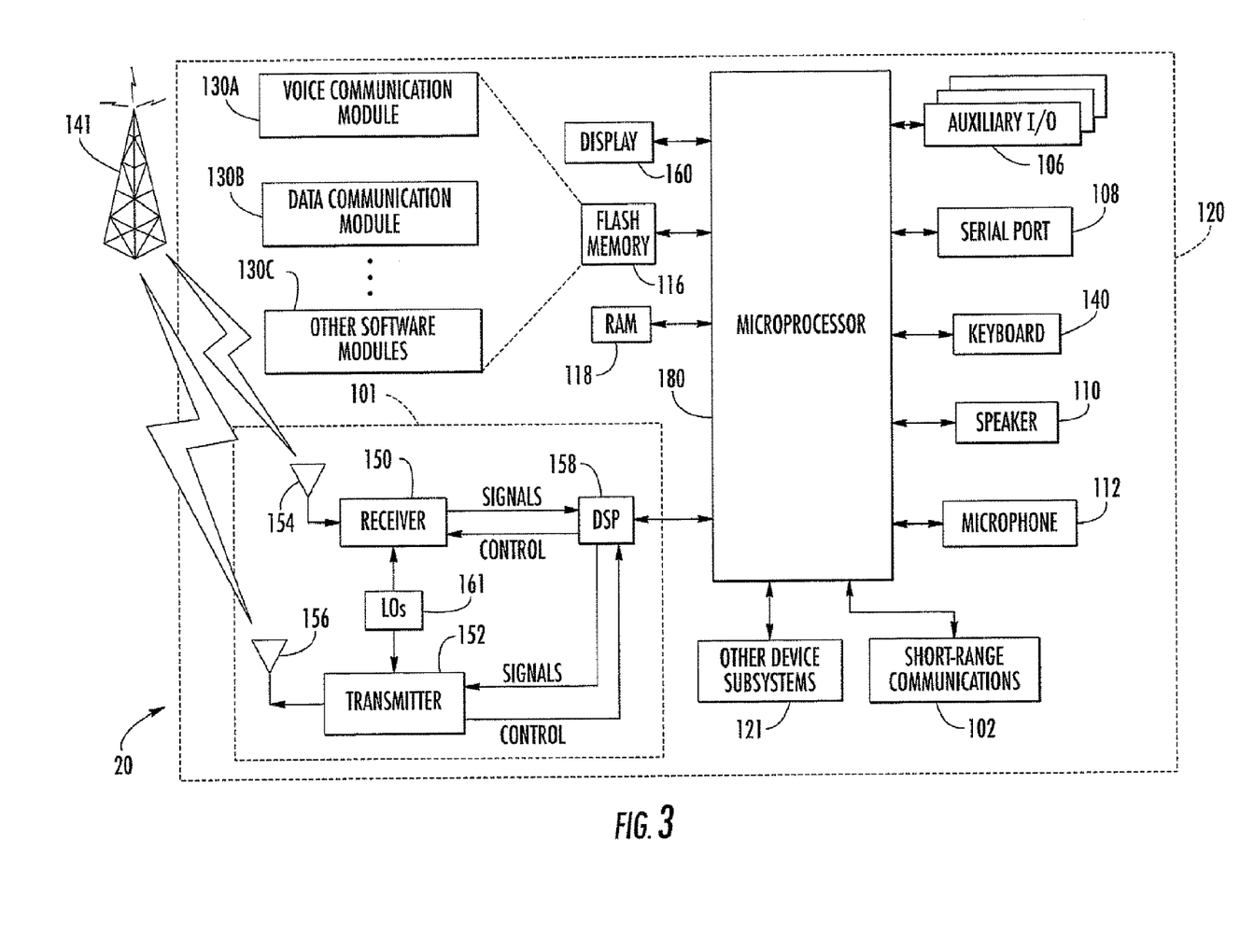
FIG. 3 is a schematic block diagram showing basic functional circuit components that can be used in the mobile wireless communications device of FIGS. 1-2.

A brief description will now proceed relative to FIGS. 1-3, which discloses an example of a mobile wireless communications device, for example, a portable cellular radio, which can incorporate non-limiting examples of various circuits that can be used with the touch activated Near Field Communications circuitry as will be described in greater detail below. FIGS. 1-3 are representative non-limiting examples of the many different types of functional circuit components and their interconnection, and operative for use with the Near Field Communications circuitry.

Referring initially to FIGS. 1 and 2, an example of a mobile wireless communications device 20, such as a portable cellular radio is first described. This device 20 illustratively includes a housing 21 having an upper portion 46 and a lower portion 47, and a dielectric substrate (i.e., circuit board) 67, such as a conventional printed circuit board (PCB) substrate, for example, carried by the housing. It should be understood that one or more circuit boards can be used. The NFC circuit could be on one circuit board and the processor and other circuitry on another circuit board. A housing cover (not shown in detail) would typically cover the front portion of the housing. The term circuit board 67 as used hereinafter can refer to any dielectric substrate, PCB, ceramic substrate or other circuit carrying structure for carrying signal circuits and electronic components within the mobile wireless communications device 20. The illustrated housing 21 is a static housing, for example, as opposed to a flip or sliding housing which are used in many cellular telephones. However, these flip, sliding and other housing configurations may also be used.

Circuitry 48 is carried by the circuit board 67, such as a microprocessor, memory, one or more wireless transceivers (e.g., cellular, WLAN, etc.), which includes RF circuitry, including audio and power circuitry, including any keyboard circuitry. It should be understood that keyboard circuitry could be on a separate keyboard, etc., as will be appreciated by those skilled in the art. A battery (not shown) is also preferably carried by the housing 21 for supplying power to the circuitry 48. The term RF circuitry could encompass the interoperable RF transceiver circuitry, power circuitry and audio circuitry.

Furthermore, an audio output transducer 49 (e.g., a speaker) is carried by an upper portion 46 of the housing 21 and connected to the circuitry 48. One or more user input interface devices, such as a keypad (keyboard) 23 (FIG. 2), is also preferably carried by the housing 21 and connected to the circuitry 48. The term keypad as used herein also refers to the term keyboard, indicating the user input devices having lettered and/or numbered keys commonly known and other embodiments, including multi-top or predictive entry modes. Other examples of user input interface devices include a scroll wheel 37 and a back button 36. Of course, it will be appreciated that other user input interface devices (e.g., a stylus or touch screen interface) may be used in other embodiments.

An antenna 45 is preferably positioned at the lower portion 47 in the housing and can be formed as a pattern of conductive traces that make an antenna circuit, which physically forms the antenna. It is connected to the circuitry 48 on the main circuit board 67. In one non-limiting example, the antenna could be formed on an antenna circuit board section that extends from the main circuit board at the lower portion of the housing. Also, a separate keyboard circuit board could be used.

Another benefit of the illustrated configuration is that it provides more room for one or more auxiliary input/output (I/O) devices 50 to be carried at the upper portion 46 of the housing. Furthermore, by separating the antenna 45 from the auxiliary I/O device(s) 50, this may allow for reduced interference therebetween.

Some examples of auxiliary I/O devices 50 include a WLAN (e.g., Bluetooth, IEEE 802.11) antenna for providing WLAN communication capabilities, and/or a satellite positioning system (e.g., GPS, Galileo, etc.) antenna for providing position location capabilities, as will be appreciated by those skilled in the art. Other examples of auxiliary I/O devices 50 include a second audio output transducer (e.g., a speaker for speaker phone operation), and a camera lens for providing digital camera capabilities, an electrical device connector (e.g., USB, headphone, secure digital (SD) or memory card, etc.).

It should be noted that the term "input/output" as used herein for the auxiliary I/O device(s) 50 means that such devices may have input and/or output capabilities, and they need not provide both in all embodiments. That is, devices such as camera lenses may only receive an optical input, for example, while a headphone jack may only provide an audio output.

As illustrated in FIG. 1, a separate NFC circuit chip 51 can be associated with other input/output devices and be operably connected to side mounted touch sensors 52, 53, such as capacitive touch sensors. A third touch sensor 54, such as a capacitive touch sensor can be located at the bottom of the device and used for determining that there are no "false positives," as will be explained in detail below. For example, the third capacitive touch sensor 54 would be positioned such that if the two side capacitive touch sensors 52 and 53 are activated while the third capacitive touch sensor is activated, the NFC circuit 51 will not be activated.

The device 20 further illustratively includes a display 22, for example, a liquid crystal display (LCD) carried by the housing 21 and connected to the circuitry 48. A back button 36 and scroll wheel 37 can also be connected to the circuitry 48 for allowing a user to navigate menus, text, etc., as will be appreciated by those skilled in the art. The scroll wheel 37 may also be referred to as a "thumb wheel" or a "track wheel" in some instances. The keypad 23 illustratively includes a plurality of multi-symbol keys 24 each having indicia of a plurality of respective symbols thereon. The keypad 23 also illustratively includes an alternate function key 25, a next key 26, a space key 27, a shift key 28, a return (or enter) key 29, and a backspace/delete key 30.

The next key 26 is also used to enter a "*" symbol upon first pressing or actuating the alternate function key 25. Similarly, the space key 27, shift key 28 and backspace key 30 are used to enter a "0" and "#", respectively, upon first actuating the alternate function key 25. The keypad 23 further illustratively includes a send key 31, an end key 32, and a convenience (i.e.,  menu) key 39 for use in placing cellular telephone calls, as will be appreciated by those skilled in the art.

Moreover, the symbols on each key 24 are arranged in top and bottom rows. The symbols in the bottom rows are entered when a user presses a key 24 without first pressing the alternate function key 25, while the top row symbols are entered by first pressing the alternate function key. As seen in FIG. 2, the multi-symbol keys 24 are arranged in the first three rows on the keypad 23 below the send and end keys 31, 32. Furthermore, the letter symbols on each of the keys 24 are arranged to define a QWERTY layout. That is, the letters on the keypad 23 are presented in a three-row format, with the letters of each row being in the same order and relative position as in a standard QWERTY keypad.

Each row of keys (including the fourth row of function keys 25-29) is arranged in five columns. The multi-symbol keys 24 in the second, third, and fourth columns of the first, second, and third rows have numeric indicia thereon (i.e., 1 through 9) accessible by first actuating the alternate function key 25. Coupled with the next, space, and shift keys 26, 27, 28, which respectively enter a "*", "0", and "*" upon first actuating the alternate function key 25, as noted above, this set of keys defines a standard telephone keypad layout, as would be found on a traditional touch-tone telephone, as will be appreciated by those skilled in the art.

Accordingly, the mobile wireless communications device 20 as described may advantageously be used not only as a traditional cellular phone, but it may also be conveniently used for sending and/or receiving data over a cellular or other network, such as Internet and email data, for example. Of course, other keypad configurations may also be used in other embodiments. Multi-tap or predictive entry modes may be used for typing e-mails, etc. as will be appreciated by those skilled in the art.

The antenna 45 is preferably formed as a multi-frequency band antenna, which provides enhanced transmission and reception characteristics over multiple operating frequencies. More particularly, the antenna 45 is designed to provide high gain, desired impedance matching, and meet applicable SAR requirements over a relatively wide bandwidth and multiple cellular frequency bands. By way of example, the antenna 45 preferably operates over five bands, namely a 850 MHz Global System for Mobile Communications (GSM) band, a 900 MHz GSM band, a DCS band, a PCS band, and a WCDMA band (i.e., up to about 2100 MHz), although it may be used for other bands/frequencies as well. To conserve space, the antenna 45 may advantageously be implemented in three dimensions although it may be implemented in two-dimensional or planar embodiments as well.

The mobile wireless communications device shown in FIGS. 1 and 2 can incorporate e-mail and messaging accounts and provide different functions such as composing e-mail, PIN messages, and SMS messages. The device can manage messages through an appropriate menu that can be retrieved by choosing a messages icon. An address book function could add contacts, allow management of an address book, set address book options and manage SIM card phone books. A phone menu could allow for the making and answering of phone calls using different phone features, managing phone call logs, setting phone options, and viewing phone information. A browser application could permit the browsing of web pages, configuring a browser, adding bookmarks, and changing browser options. Other applications could include a task, memo pad, calculator, alarm and games, as well as handheld options with various references.

A calendar icon can be chosen for entering a calendar program that can be used for establishing and managing events such as meetings or appointments. The calendar program could be any type of messaging or appointment/meeting program that allows an organizer to establish an event, for example, an appointment or meeting.

A non-limiting example of various functional components that can be used in the exemplary mobile wireless communications device 20 of FIGS. 1 and 2 is further described in the example below with reference to FIG. 3. The device 20 illustratively includes a housing 120, a keypad 140 and an output device 160. The output device 160 shown is preferably a display, which is preferably a full graphic LCD. Other types of output devices may alternatively be used. A processing device 180 is contained within the housing 120 and is coupled between the keypad 140 and the display 160. The processing device 180 controls the operation of the display 160, as well as the overall operation of the mobile device 20, in response to actuation of keys on the keypad 140 by the user.

The housing 120 may be elongated vertically, or may take on other sizes and shapes (including clamshell housing structures). The keypad may include a mode selection key, or other hardware or software for switching between text entry and telephony entry.

In addition to the processing device 180, other parts of the mobile device 20 are shown schematically in FIG. 3. These include a communications subsystem 101; a short-range communications subsystem 102; the keypad 140 and the display 160, along with other input/output devices 106, 108, 110 and 112; as well as memory devices 116, 118 and various other device subsystems 121. The mobile device 20 is preferably a two-way RF communications device having voice and data communications capabilities. In addition, the mobile device 20 preferably has the capability to communicate with other computer systems via the Internet.

Operating system software executed by the processing device 180 is preferably stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the random access memory (RAM) 118. Communications signals received by the mobile device may also be stored in the RAM 118.

The processing device 180, in addition to its operating system functions, enables execution of software applications 130A-130N on the device 20. A predetermined set of applications that control basic device operations, such as data and voice communications 130A and 130B, may be installed on the device 20 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 141. Preferably, the PIM data items are seamlessly integrated, synchronized and updated via the wireless network 141 with the device user's corresponding data items stored or associated with a host computer system.

Communication functions, including data and voice communications, are performed through the communications subsystem 101, and possibly through the short-range communications subsystem. The communications subsystem 101 includes a receiver 150, a transmitter 152, and one or more antennae 154 and 156. In addition, the communications subsystem 101 also includes a processing module, such as a digital signal processor (DSP) 158, and local oscillators (LOs) 161. The specific design and implementation of the communications subsystem 101 is dependent upon the communications network in which the mobile device 20 is intended to operate. For example, the mobile device 20 may include a communications subsystem 101 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 20.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 20 may send and receive communications signals over the communication network 141. Signals received from the communications network 141 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communications functions, such as demodulation and decoding. In a similar manner, signals to be transmitted to the network 141 are processed (e.g., modulated and encoded) by the DSP 158 and are then provided to the transmitter 152 for digital to analog conversion, frequency up conversion, filtering, amplification and transmission to the communication network 141 (or networks) via the antenna 156.

In addition to processing communications signals, the DSP 158 provides for control of the receiver 150 and the transmitter 152. For example, gains applied to communications signals in the receiver 150 and transmitter 152 may be adaptively controlled through automatic gain control algorithms implemented in the DSP 158.

In a data communications mode, a received signal, such as a text message or web page download, is processed by the communications subsystem 101 and is input to the processing device 180. The received signal is then further processed by the processing device 180 for an output to the display 160, or alternatively to some other auxiliary I/O device 106. A device user may also compose data items, such as e-mail messages, using the keypad 140 and/or some other auxiliary I/O device 106, such as a touchpad, a rocker switch, a thumb-wheel, or some other type of input device. The composed data items may then be transmitted over the communications network 141 via the communications subsystem 101.

In a voice communications mode, overall operation of the device is substantially similar to the data communications mode, except that received signals are output to a speaker 110, and signals for transmission are generated by a microphone 112. Alternative voice or audio I/O subsystems, such as a voice message recording subsystem, may also be implemented on the device 20. In addition, the display 160 may also be utilized in voice communications mode, for example to display the identity of a calling party, the duration of a voice call, or other voice call related information and the NFC communications.

Any short-range communications subsystem enables communication between the mobile device 20 and other proximate systems or devices, which need not necessarily be similar devices. For example, the short-range communications subsystem may include an infrared device and associated circuits and components, or a Bluetooth™ communications module to provide for communication with similarly-enabled systems and devices and the NFC communications.

It should be understood that GSM is a preferred communications system and uses a radio interface that can have an uplink frequency band and downlink frequency band with about 25 MHz bandwidth, typically subdivided into 124 carrier frequency channels, each spaced about 200 KHz apart as non-limiting examples. Time division multiplexing can be used to allow about 8 speech channels per radio frequency channel, giving 8 radio time slots and 8 burst periods grouped into what is called a TDMA frame. For example, a channel data rate could be about 270.833 Kbps and a frame duration of about 4.615 milliseconds (MS) in one non-limiting example. The power output can vary from about 1 to about 2 watts.

Typically, linear predictive coding (LPC) can be used to reduce the bit rate and provide parameters for a filter to mimic a vocal track with speech encoded at about 13 Kbps. Four different cell sizes can be used in a GSM network, including macro, micro, pico and umbrella cells. A base station antenna can be installed on a master building above the average rooftop level in a macrocell. In a macrocell, the antenna height can be under the average rooftop level and used in urban areas. Microcells typically have a diameter of about a few dozen meters and are used indoors. Umbrella cells can cover shadowed regions or smaller cells. Typically, the longest distance for the GSM specification covered by an antenna is about 22 miles depending on antenna height, gain and propagation conditions.

GSM systems typically include a base station subsystem, a network and switching subsystem, and a General Packet Radio Service (GPRS) core network. A subscriber identify module (SIM) is usually implemented in the communications device, for example, the well known SIM card, similar to a smart card containing the subscription information and phone book of a user. The user can also switch handsets or could change operators by changing a SIM. USIM and RUIM and other similar technologies can be used.

The GSM signaling protocol has three general layers. Layer 1 is a physical layer using channel structures above the air interface. Layer 2 is the data link layer. Layer 3 is a signaling protocol, which includes three sublayers. These include a Radio Resources Management sublayer to control the setup, maintenance and termination of radio and fixed channels, including handovers. A Mobility Management sublayer manages the location updating and registration procedures and secures the authentication. A Connection Management sublayer handles general call control and manages supplementary services and the short message service. Signaling between different entities such as the Home Location Register (HLR) and Visiting Location Register (VLR) can be accomplished through a Mobile Application Part (MAP) built upon the Transaction Capabilities Application Part (TCAP) of the top layer of the Signaling System No. 7.

A Radio Resources Management (RRM) sublayer can oversee the radio and fixed link establishment between the mobile station and an MSE.

It is also possible to used Enhanced Data Rates for GSM Evolution (EDGE), as an enhancement to General Packet Radio Service (GPRS) networks. EDGE can use 8 Phase Shift Keying (8 PSK) and Gaussian Minimum Shift Keying (GMSK) for different modulation and coding schemes. A three-bit word can be produced for every changing carrier phase. A rate adaptation algorithm can adapt the Modulation and Coding Scheme (MCS) according to the quality of the radio channel and the bit rate and robustness of data transmission. Base stations are typically modified for EDGE use.

Figure 4:
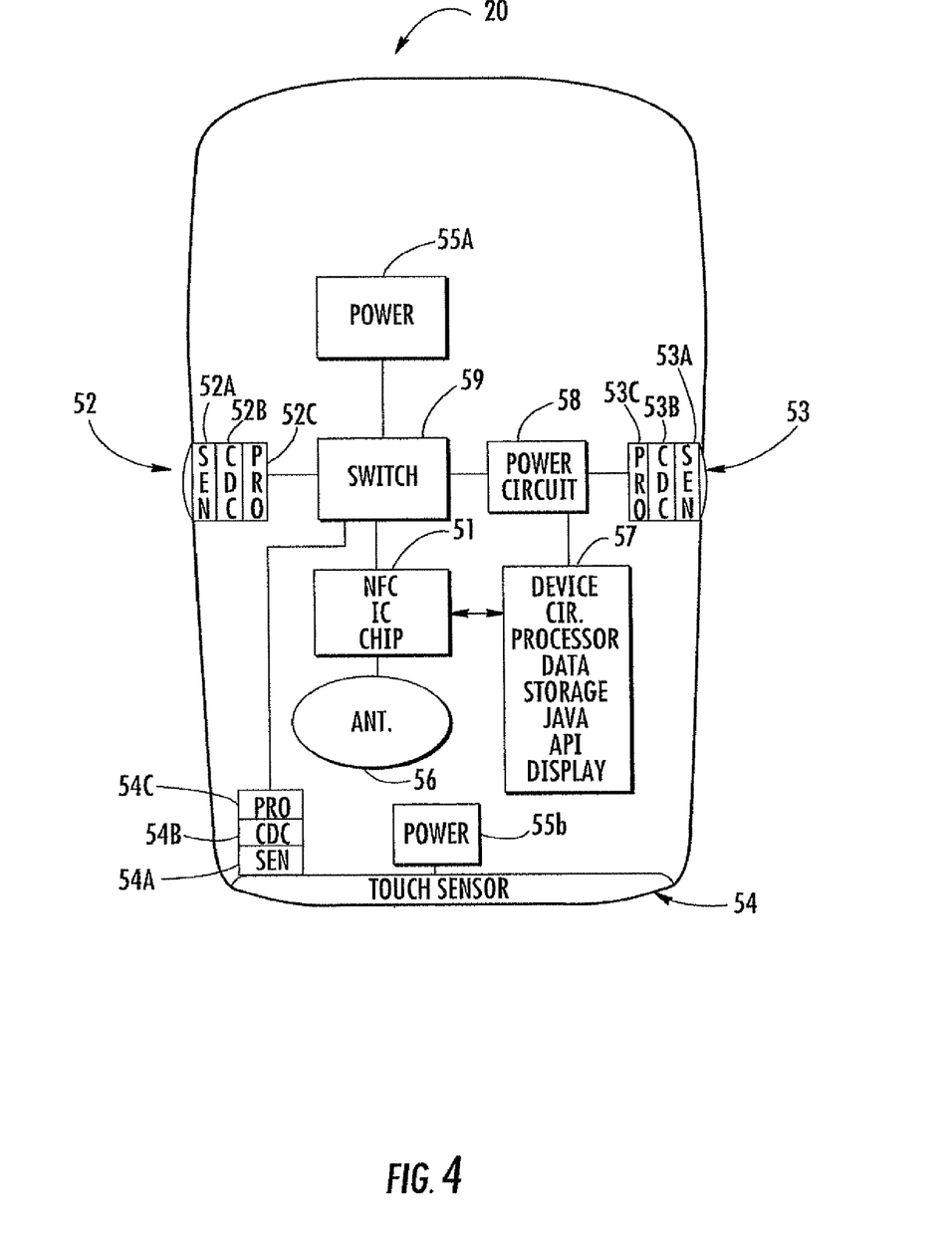
FIG. 4 is another block diagram of an example of a mobile wireless communications device and showing the components for the NFC IC chip, antenna circuit and touch activated sensors in accordance with a non-limiting example.

FIG. 4 is another block diagram of the mobile wireless communications device 20 with further details of the touch activated sensors and Near Field Communication (NFC) circuit 51. As illustrated, the capacitive touch sensors 52, 53 are located on either side of the housing 21 at a middle area of the device 20 such that when the user desires to activate the NFC circuit 51, the user grasps with two fingers the touch sensors 52, 53 while the palm of the user's hand is placed against the front portion of the mobile wireless communications device. The user touches the rear portion of the device against another NFC device or tag while activating the NFC circuit by touching the side sensors 52, 53. The third capacitive touch sensor 54 is located at the bottom of the mobile wireless communications device and when touched, such as by the palm of the user's hand, prevents power activation of the NFC IC chip 51.

For example, when activating the NFC circuit 51 to use the NFC enabled device, typically the user will grasp the two capacitive touch sensors 52, 53 with two fingers, while the palm of the user's hand will be positioned at the front part of the mobile wireless communications device. The user touches the rear of the upper side of the housing against an NFC tag or other NFC-enabled device. The third touch sensor 54 is positioned and configured such that it is not touched and the NFC circuit enabled. The use of the third capacitive touch sensor will ensure that there are no "false positives" since, if it is touched while the other two touch sensors 52,53 are touched, the power is not enabled to the NFC IC chip even though the capacitive touch sensors are activated. When the user is regularly holding the device for email messaging or telephone communications, the third sensor is touched and activated. Even accidental touching to the side sensors 52, 53 will not activate the NFC circuit.

As shown in FIG. 4, a power circuit 55a supplies power to the side mounted capacitive touch sensors on either side of the housing. A power circuit 55b supplies power to the third capacitive touch sensor 54. The NFC IC chip 51 includes an antenna "loop" circuit 56 configured for NFC communications. The NFC chip is connected to the other circuitry such as the microprocessor, data storage, and display as non-limiting examples, and shown by the block at 57, corresponding to many of the circuit functions shown at Blocks 48, 50 in FIG. 1. A power circuit 58 for the device is connected into a switch circuit 59, which also connects the capacitive touch sensors 52, 53, 54 such that power cannot be provided to the NFC IC chip 51 unless the switch circuit 59 enables the power, such as when the two capacitive touch sensors 52, 53 at the side are touched. Of course, if the third sensor is touched 54, the switch 59 does not enable power.

Figure 5:
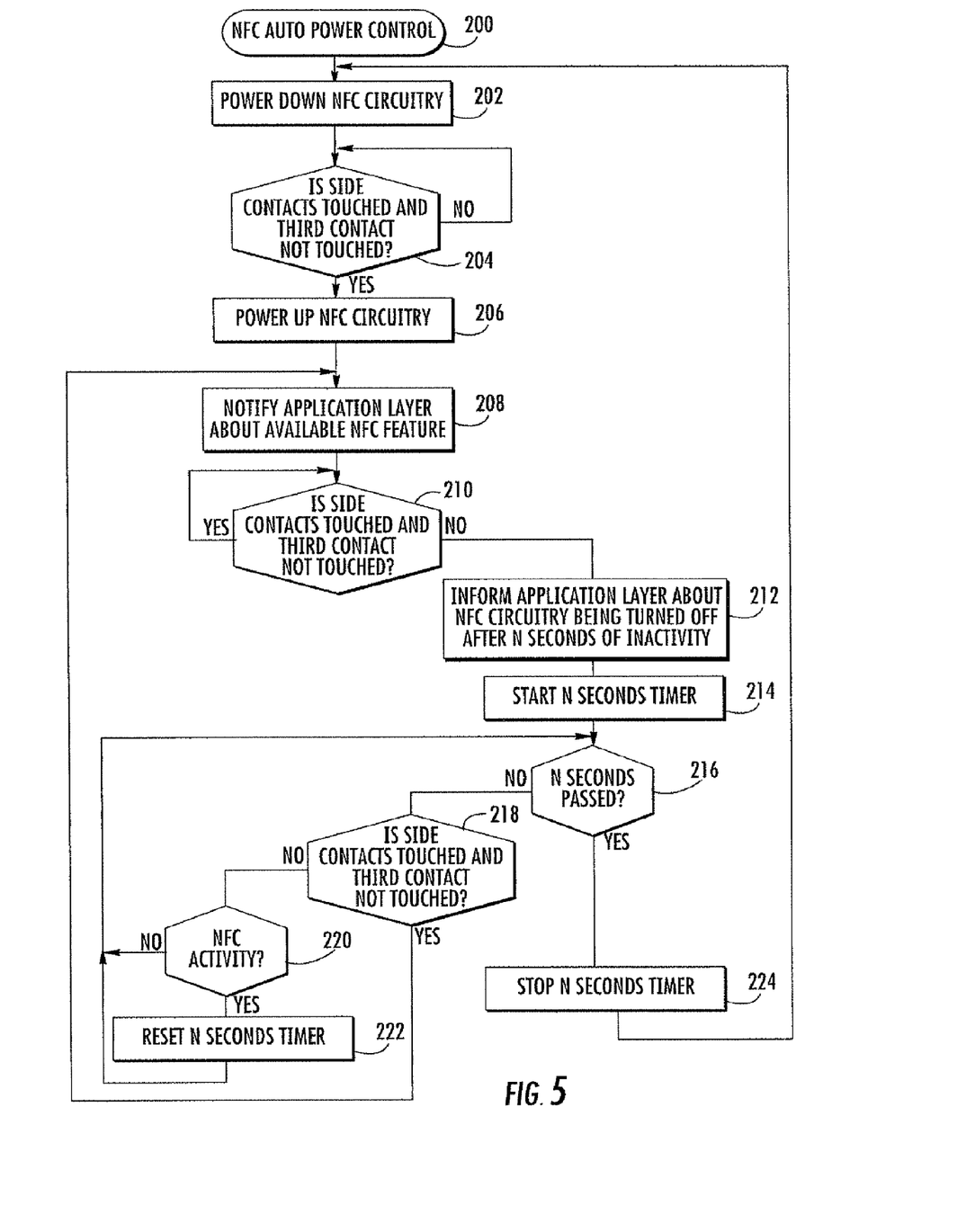
FIG. 5 is an example of a high-level flowchart illustrating a basic sequence of operation for the touch activated NFC circuit in accordance with a non-limiting example.

FIG. 5 is a high-level flow chart illustrating a basic method or sequence of steps for operation of the mobile wireless communication device with a touch activated NFC circuitry and shows the NFC automatic power control as a start of initiation at block 200. The NF circuitry is powered down (block 202). A determination is made if the side contacts are touched and the third contact is not touched (block 204). If not the loop continues and if yes the NFC circuitry is powered up (block 206). At this time the application layer is notified about any available NFC features (block 208). A determination is made if the side contacts are touched and third contact not touched (block 210). If yes the loop continues and if not the application is informed about the NFC circuitry being turned off after N seconds of inactivity (block 212). The end seconds timer is started (block 214) and a determination is made if N seconds has passed (block 216). If not than a determination is made if the side contacts are touched and third contact is not touched (block 218). If yes then the loop continues back to the beginning of block 208 and if not then a determination is made concerning the NFC activity (block 220). If not then the loop continues to beginning of the block 216 and if yes then the end seconds timer is reset (block 222). If the end seconds has passed to block 216, then the end seconds timer is stopped (block 224).

It should be understood that the capacitive touch sensors can be formed from different materials including polyester-based capacitors and similarly formed materials. Typically, as illustrated in FIG. 4, each capacitive touch sensor 52, 53, 54 may include a capacitive sensor portion (SEN) 52a, 53a, 54a and capacitance-to-digital converter (CDC) 52b, 53b and 54b that are each operable with a touch sensor processor circuit 52c, 53c, and 54c of the mobile wireless communications device. The capacitive touch sensors 52,53,54 could be manufactured using traces on standard two- or four-layer printed circuit board or on a flex circuit. Each capacitance-to-digital converter 52b, 53b and 54b could be positioned on one capacitance sensor board (not shown) with each capacitance-to-digital converter including various sensor inputs and an excitation source.

it is possible for each capacitive touch sensor 52, 53, 54 to include a glass overlay, with as much as few millimeters. It should be understood that the capacitive touch sensors 52, 53, 54 could use conductors that interact with electric fields and are operable with finger touching because the human body contains conductive electrolytes covered by the skin as a lossy dielectric. The fingers can make capacitive touch sensing possible even with thick glass overlays. The sizes of the sensors can vary also. For example, a button diameter as part of a capacitive touch sensor button could be about 10 millimeters, the average size of an adult fingertip. Any printed circuit board used with such layers could include a ground layer and a circular cut-out with a sensor in the middle. The PCB could be formed from FR4 in one non-limiting example. The dielectric constant could influence how tightly the electric field energy can pack into the material as the electric field tries to find a shorter path.

The capacitive touch sensors could include a programmable current source, precision analog comparator and analog multiplexer bus that can sequence through an array of different touch sensors or one sensor. A relaxation oscillator could function as the capacitive touch sensor. The capacitive touch sensor could include circuitry having an output from a comparator that is fed into a clock input of a PWM that gates a counter. A finger positioned on the sensor could increase the capacitance, thus, increasing the counts. Different capacitive touch sensors, as known to those skilled in the art, could be used besides those types of sensors as described above.

Many different types of NFC IC circuit chips can possibly be used in accordance with non-limiting examples of the patent invention. The NFC IC circuit chip could provide an interface that operates in both an active and passive mode and transfers data using load modulation while also allowing for card emulation, such as ticketing applications. The NFC IC circuit chip could be a system-on-chip solution. It is also possible to integrate the NFC with a Bluetooth, WiFi or UWB chip set because many of the processes and components required by these RF-based technologies such as the antenna, power, clock, data bus, and other components are the same. Different types of components could also be used, for example, the PN65K Near Field Communication (NFC) smart connect module such as manufactured by NXP, founded by Phillips Corporation, or the Near Field Communication PN531 microprocessor based transmission module manufactured by Phillips Semiconductor.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device comprising;
a housing;
a processor carried by the housing;
a Near Field Communications (NFC) circuit carried by the housing, coupled to the processor, and configured to communicate in accordance with an NFC communications protocol; and
a touch activated sensor operable with finger touching exposed on the housing and configured to turn on the NFC circuit when the touch activated sensor is touched.

2. The mobile wireless communications device according to claim 1, further comprising a circuit board supporting the NFC circuit.

3. The mobile wireless communications device according to claim 1, further comprising a circuit board supporting the processor.

4. The mobile wireless communications device according to claim 1, wherein the touch activated sensor is positioned to be touched by at least one finger when the housing is manually grasped and placed near another NFC enabled device.

5. The mobile wireless communications device according to claim 1, wherein the touch activated sensor comprises a capacitive touch sensor.

6. The mobile wireless communications device according to claim 1, wherein the touch activated sensor comprises a capacitance-to-digital converter and circuitry associated therewith.

7. The mobile wireless communications device according to claim 1, wherein the NFC circuit comprises an NFC integrated circuit (IC) chip.

8. The mobile wireless communications device according to claim 1, further comprising a power circuit configured to supply power to the NFC circuit, and a switch coupled between the power circuit and the NFC circuit and coupled to the touch activated sensor and operable to switch power on for the NFC circuit only when the touch activated sensor is touched.

9. A mobile wireless communications device comprising:
a housing;
radio frequency (RF) circuitry carried by the housing;
a Near Field Communications (NFC) circuit carried by the housing;
a processor carried by the housing and coupled to the RF circuitry and NFC circuit; and
a touch activated sensor operable with finger touching carried by the housing and configured to enable the NFC circuit when the touch activated sensor is touched.

10. The mobile wireless communications device according to claim 9, further comprising a circuit board supporting the RF circuitry, the NFC circuit, and the processor.

11. The mobile wireless communications device according to claim 9, wherein the touch activated sensor is positioned to be touched by at least one finger when the housing is manually grasped and placed near another NFC enabled device.

12. The mobile wireless communications device according to claim 9, wherein the touch activated sensor comprises a capacitive touch sensor.

13. The mobile wireless communications device according to claim 9, wherein the touch activated sensor comprises a capacitance-to-digital converter and circuitry associated therewith.

14. The mobile wireless communications device according to claim 9, wherein the NFC circuit comprises an NFC integrated circuit (IC) chip.

15. A method for Near Field Communications (NFC) circuit within a mobile wireless communications device including a touch activated sensor operable with finger touching, comprising:
   touching the touch activated sensor operable with finger touching to enable the NFC circuit; and
   manually positioning the mobile wireless communications device adjacent another NFC device to establish NFC communications therebetween.

16. The method according to claim 15, wherein the touch activated sensor comprises a capacitive touch sensor.

17. The method according to claim 15, wherein the touch activated sensor comprises a capacitance-to-digital converter and circuitry associated therewith.

18. The method according to claim 15, further comprising switching power to the NFC circuit based upon the touch activated sensor.

\* \* \* \* \*